K. C. MACKAY.
Mason's Pointing Tool.
No. 210,947.                    Patented Dec. 17, 1878.
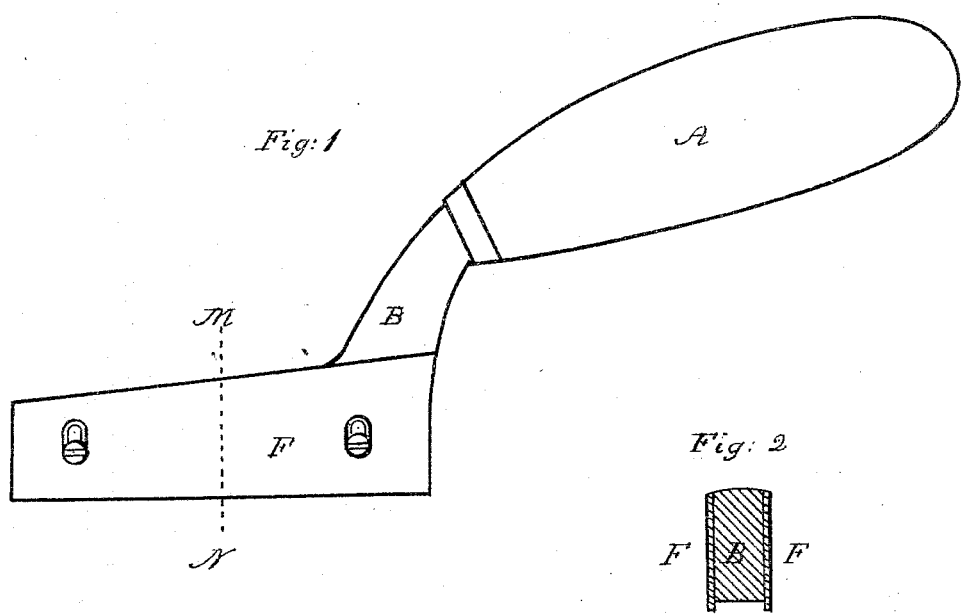
Witnesses
P. B. Kissam
E. E. Orvis
Inventor
Kenneth C. Mackay

UNITED STATES PATENT OFFICE.

KENNETH C. MACKAY, OF MADISON, WISCONSIN.

IMPROVEMENT IN MASONS' POINTING-TOOLS.

Specification forming part of Letters Patent No. 210,947, dated December 17, 1878; application filed September 9, 1874.

*To all whom it may concern:*

Be it known that I, KENNETH C. MACKAY, of the city of Madison, in the county of Dane and State of Wisconsin, have invented a Mason's Pointing-Tool, of which the following is a specification:

My invention consists, substantially, of a tool for pointing mortar-joints with projecting flanges, having for its object the regulation of the width of the mortar-line and its projection from the wall.

In the accompanying drawing, Figure 1 represents a side elevation of the tool embodying my invention. Fig. 2 is a section of the same on line M N.

A is the handle of the tool. B is the tool proper, and is extended out between the two flanges F and F, which are confined by screws to the sides of B. B is made of steel, or some other metal, as are also the flanges F and F. That part of the tool marked B may assume any width desirable, the flanges projecting below the lower edge of B, to suit the projection of the pointing from the wall.

In the drawing the screw-holes are represented in the form of slots, so that when the edges of the flanges become worn they may be lowered and the same amount of projection retained.

In the ordinary way of pointing, the mortar is laid on with a trowel; then each one of the two sides has to be struck with the trowel. This tool will do all this work at once and save so much labor.

The entire tool, handle and all, might be made of steel or some other metal, or of two different metals, or any material or combination of materials found suitable.

The lower face of B between the projecting flanges might be hollowed out, instead of being flat, as in the drawing; and in this way a tool for round pointing might be made, having projecting side flanges movable by slots, or firmly screwed or riveted to the sides without any slots.

There is now in use a tool for round pointing which is made by hollowing out a solid piece, but is without projecting side flanges movable by slots or screwed or riveted to the sides of the same; but I am not aware of any tool for square pointing, nor of any tool for round pointing, having projecting side flanges or plates movable by slots or screwed or riveted to the sides of the same.

I do not, therefore, claim a tool for round pointing hollowed out of the solid metal; but What I do claim is—

1. A tool for pointing, consisting of a solid part, to which the handle is attached, with the face which is to be applied to the mortar either flat or concave, and with projecting sides riveted or screwed thereto, as set forth.

2. A tool for pointing, consisting of a solid part, to which the handle is attached, made either plane or concave, and with sides attached by screws through slots therein, as and for the purpose set forth.

KENNETH C. MACKAY.

Witnesses:
P. B. KISSAM,
E. E. ORVIS.